Feb. 6, 1923.
S. C. BARSBY ET AL.
PEDAL LOCKING DEVICE FOR AUTOMOBILES.
FILED MAR. 21, 1921.
1,444,298
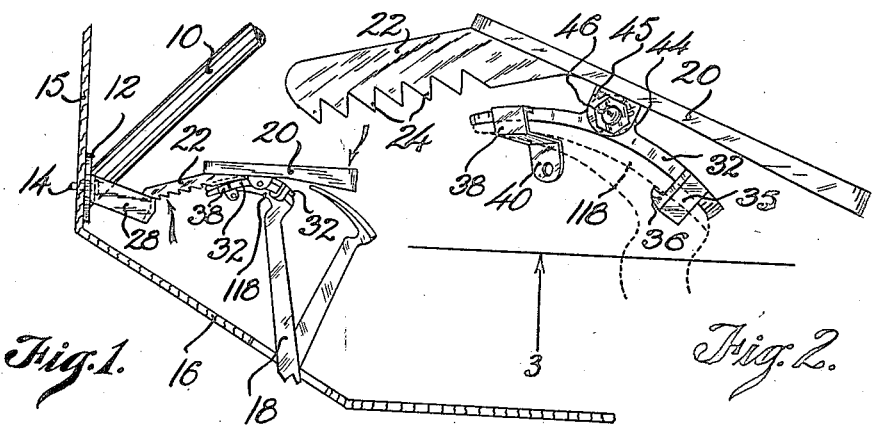
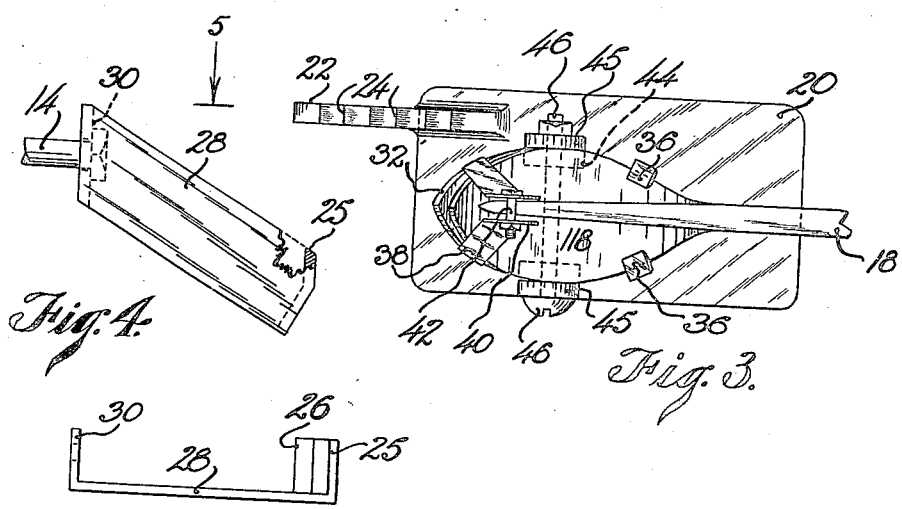
Inventor
S.C.Barsby & W.L.Smith.
By
Attorney Patented Feb. 6, 1923.

1,444,298

UNITED STATES PATENT OFFICE.

STUART C. BARSBY AND WALTER L. SMITH, OF DENVER, COLORADO.

PEDAL-LOCKING DEVICE FOR AUTOMOBILES.

Application filed March 21, 1921. Serial No. 454,112.

*To all whom it may concern:*

Be it known that we, STUART C. BARSBY and WALTER L. SMITH, citizens of and residing at the city and county of Denver and State of Colorado, have invented certain new and useful Improvements in Pedal-Locking Devices for Automobiles; and they do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a device adapted to lock in position a pedal used on certain automobiles for controlling the various gear positions and for holding the same in low gear position.

Briefly, the invention comprises a plate pivoted upon a base adapted to be secured to the pedal, said plate having an extending arm adapted to be adjustably engaged with a fixed projecting catch. The driver may rock the plate with his foot in order to bring the arm into engagement with said catch, either for holding the pedal in neutral position or for holding it under any degree of tension in low position.

In the drawings:

Fig. 1 is a side elevation indicating the application of the invention;

Fig. 2 is a side elevation of the device, per se;

Fig. 3 is a view of the under side thereof, as indicated by the line 3 of Fig. 2;

Fig. 4 is an enlarged side elevation of the fixed catch; and

Fig. 5 is a plan thereof.

The drawings show a steering post 10 of an automobile to which there is fixed a vertically-disposed plate 12 secured by means of bolts 14 to the dash 15 of the automobile. The floor board 16 is also shown, which is slotted to receive the upwardly-projecting pedal 18 which controls the positions of the gear shift. When this pedal is in rear position, the shift is in high; when in intermediate position as shown in Fig. 1, the shift is in neutral; and when the pedal is further depressed, the shift is in low.

The present invention comprises a plate 20 which has at its forward end a forwardly-projecting arm 22 provided with a plurality of notches or teeth 24 adapted to engage with the upper edge 25 of a transversely-disposed arm 26 of a catch bar 28 having at its forward end a second offset arm 30 which is adapted to receive one of the bolts 14 which secures the plate 12 of the steering post to the dash 15 and by means of which bolt 14 and arm 30 said catch bar 28 is retained in fixed position. A base 32 which has its under face curved to fit the upper face of the tread portion 118 of the pedal 18, is adapted to be secured to said tread portion 118 by means of a pair of ears 35 provided at its rear portion, said ears having inwardly offset lugs 36 to engage under the pedal tread, so that said base 32 may be slipped forward on the tread until the ears 35 firmly engage the sides of said tread. The forward end of the base 32 is adapted to be secured on said tread 118 by means of a metallic clamp 38 which is clamped around the forward ends of the tread 118 and the plate 32 through the medium of depending ears 40 on the clamp and a clamping bolt 42. If desired, the upper face of the base 32 may be slightly countersunk to receive the upper band of said clamp 38 in order to prevent slipping.

The plate 32 is provided with upstanding ears 44 which are positioned between depending ears 45 on the plate 20, said ears 44 and 45 being retained in rocking relation by means of a pivoting bolt 46.

In operation, the driver's foot will rest upon the plate 20, whereby the same may be readily tilted so that a forward tooth 24 may engage the retaining edge 25 of the latch bar 28 to maintain the pedal 18 in neutral position. In order to retain the pedal in low position, the same will be pressed farther forward and one of the rearward teeth 24 will be engaged with the retaining edge 25. The device is principally designed to maintain the pedal in this low gear position so that when running through sand or climbing hills the driver may be relieved of the necessity of holding the pedal 18 in forward or low gear position which becomes very tiresome after a short time. The device may be readily released by the driver's pressing his foot upon the plate 20 and swinging the arm 22 upward so that the pedal may be turned to rearward position.

If desired the device could also be employed upon the brake pedal which is adjacent the pedal 18 and could be held in braking position in the same manner.

From the foregoing it will be seen that we have provided a simple device which may be quickly attached to a pedal and is easily and positively operated to retain the pedal in a forward position. At the same time the normal operation of the pedal will not be interfered with because under such circumstances the plate 20 will have its lower or rear end in a downward position where said rear end will engage the rear edge of the base 32, thus throwing the arm 22 upward out of latch-engaging position.

We claim:

1. A pedal lock comprising a base adapted to be secured to the upper surface of a pedal, a foot plate pivotally mounted on said base, an arm carried by said plate, and projecting from the lower surface thereof and a stationary member adapted to be engaged by said arm to hold the pedal in adjusted position.

2. A pedal lock comprising a base means integral therewith for securing it to the upper surface of a pedal, a foot plate pivotally mounted on said base, an arm carried by said plate and projecting at an angle from the lower side thereof, and a stationary member adapted to be engaged by said arm to hold the pedal in adjusted position, said arm having a plurality of notches therein which may be selectively engaged with said stationary member.

3. In combination, a pedal, a base, a pair of hooks on the under side of said base and adapted to engage a pedal, a pair of lugs projecting downwardly from said base and adapted to receive a bolt, whereby the base may be clamped to said pedal, a pair of upwardly extending lugs on said base, a plate pivotally connected to said lugs, an arm connected to said plate and extending at an angle from the under surface thereof, said arm having a plurality of teeth on its lower side and a stationary member provided with means for engaging said teeth to hold the pedal in adjusted position.

In testimony whereof we affix our signatures.

STUART C. BARSBY.
WALTER L. SMITH.